United States Patent [19]
Bedlek et al.

[11] Patent Number: 5,103,467
[45] Date of Patent: Apr. 7, 1992

[54] ASYNCHRONOUS VOICE RECONSTRUCTION FOR A DIGITAL COMMUNICATION SYSTEM

[75] Inventors: Greogory J. Bedlek, Barrington; Richard E. White, Schaumburg; Thomas A. Freeburg, Arlington Heights, all of Ill.

[73] Assignee: Motorola, Inc., Schaumburg, Ill.

[21] Appl. No.: 429,599

[22] Filed: Oct. 31, 1989

[51] Int. Cl.$^5$ .................. H04L 7/02; H04L 25/36
[52] U.S. Cl. ............................ 375/118; 369/60
[58] Field of Search ............ 375/117, 118, 112; 370/108, 111; 369/60; 379/67, 88; 381/31, 33; 341/110

[56] References Cited
U.S. PATENT DOCUMENTS

| | | | |
|---|---|---|---|
| 3,420,956 | 1/1969 | Heightley et al. | 375/118 X |
| 4,759,041 | 7/1988 | Anderson et al. | 375/118 |
| 4,803,726 | 2/1989 | Levine et al. | 380/48 |
| 4,841,574 | 6/1989 | Pham et al. | 381/31 |
| 4,885,758 | 12/1989 | Speckenbach | 375/118 |
| 4,941,156 | 7/1990 | Stern et al. | 375/118 |

Primary Examiner—Benedict V. Safourek
Assistant Examiner—Tesfaldet Bocure
Attorney, Agent, or Firm—Val Jean F. Hillman

[57] ABSTRACT

A method and apparatus for performing the asynchronous reconstruction of a digital data stream is disclosed. An input data stream having an input rate, such as digitized speech, is stored in a circular buffer. Within the buffer, read and write marker positions are determined. Upon subsequent retrieval of the data stream at an output rate, data is taken from the position of the read marker each time data is written to the position of the write marker. Of importance, the read and write marker positions are determined such that they provide a delay greater than the difference between the input rate and the output rate over the length of the buffer. The data stream processing is then modified by ignoring at least some of the data stream when the input rate is faster than the output rate, and repeating at least some of the data stream when the input rate is slower than the output rate. In this manner a method of digitized voice reconstruction without reliance upon network synchronizatin is achieved.

20 Claims, 1 Drawing Sheet

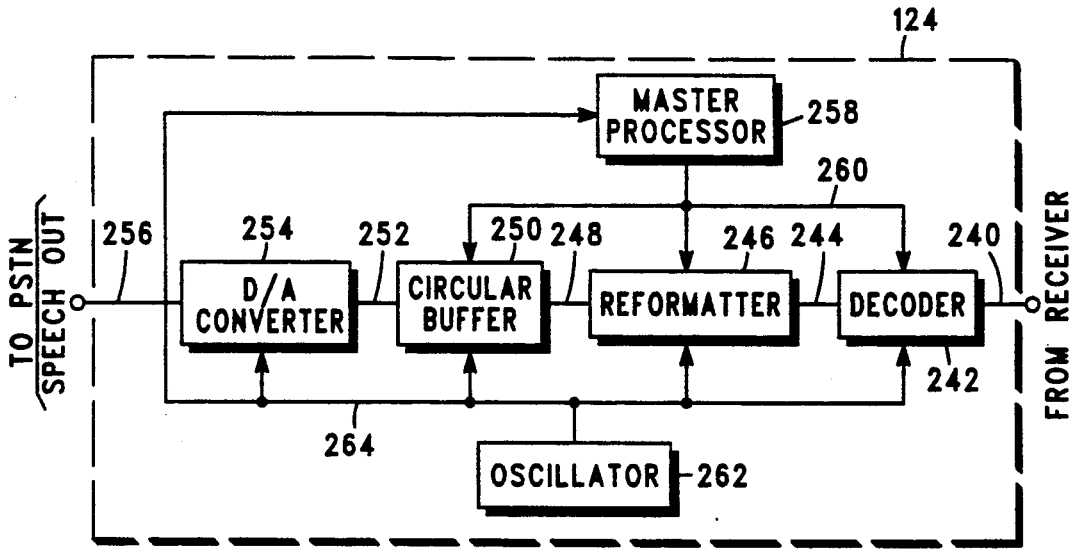
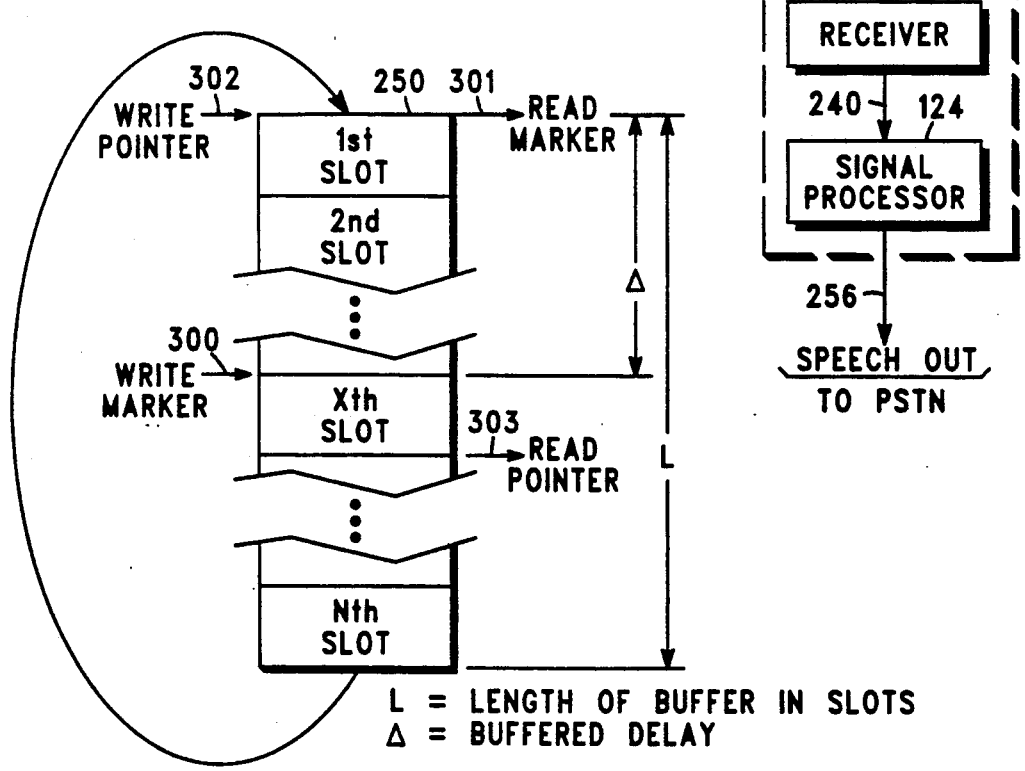

ASYNCHRONOUS VOICE RECONSTRUCTION FOR A DIGITAL COMMUNICATION SYSTEM

TECHNICAL FIELD

This invention relates in general to communication systems, and in particular to digital communication systems which receive digitized voice and data information. More specifically, the present invention pertains to the asynchronous reconstruction of digitized speech.

BACKGROUND OF THE INVENTION

One of the recent trends in the communications art is the development of digital communication systems, capable of transmitting and receiving data and voice information utilizing digital techniques. In such systems, a voice pattern, for example, is first digitized to form a digital data stream and then transmitted over a transmission path to a receiver. The receiver, in turn, decodes the digital signal and converts it back into the original voice pattern.

All digital communication systems require some degree of synchronization in order to properly detect an incoming carrier signal, recapture the transmitted digital information, and insure the quality of the reconstructed speech. In this context, synchronization pertains to a relationship between the transmitter and the receiver wherein they maintain concurrent frequency and phase. It will be appreciated, however, that most digital communication systems employ several levels of synchronization in order to achieve these goals. Some examples are: phase, symbol, frame, and network synchronization.

Phase synchronization occurs when the receiver establishes a phase concurrence between an incoming carrier sinusoid and a receiver reference signal such that the incoming sinusoid and the reference pass through zero simultaneously. This condition is known as phase lock, and will enable the receiver to successfully detect the presence of a carrier signal.

Symbol (bit) synchronization is achieved when the receiver produces a square wave that transitions through zero simultaneously with the incoming signal's transitions between symbols (bits). This synchronization is required in order to establish the proper symbol interval, thereby enabling the receiver to make accurate symbol decisions.

Frame synchronization is required when the transmitted data is organized into blocks, packets, or messages of a uniform number of symbols. Frame synchronization is somewhat equivalent to generating a square wave having zero crossings that coincide with the transitions from one frame to the next.

Network synchronization is achieved when a phase concurrence between the transmitter master clock and the receiver master clock is established. This synchronization is employed in order to assure the timing relationship between the transmitter and the receiver does not drift. Timing drifts cause both bit slippage and bit errors, which drastically reduce the quality of digitized speech during the reconstruction of a voice pattern.

It will be appreciated by those skilled in the art that each level of synchronization utilized in a digital communication system implies additional cost. Aside from the obvious expense associated with the increased hardware and software needs, hidden costs are to be suffered as well. One cost is the additional energy expended by the transmitter producing signals used by the receiver in an effort to match operation. Another penalty is that the increased time required to achieve synchronization delays the commencement of communication. Moreover, the increased demand synchronization places on processor time reduces overall system throughput.

Currently, the entire Public Switching Telephone Network (PSTN) operates from a centrally located master clock source or universal time clock that gets distributed to all user centers nationwide. The universal time clock in the United States is generated by the U.S. National Bureau of Standards for the very purpose of providing worldwide synchronization. Due to the added expense associated with a highly synchronized operation, it is proving increasingly impractical for some digital communication systems to employ high levels of synchronization in order to interface with the PSTN. One such example is an in-building radio telephone communication system.

It would therefore be extremely advantageous to provide an alternative approach to maintaining the quality of digitized speech without the need for a highly synchronized systems.

SUMMARY OF THE INVENTION

Accordingly, a general object of the present invention is to provide a method and apparatus for reconstructing digitized speech transmitted over a transmission path into an analog representation.

Another object of the present invention is to provide such reconstruction while minimizing the dependence on synchronization.

A further object of the present invention is to provide such reconstruction while minimizing the effect of master clock timing drifts.

These and other objects are achieved by the present invention which, briefly described, is a method and apparatus for performing the asynchronous reconstruction of a digital data stream into an analog representation. An input data stream, such as digitized speech, is stored in a buffer. This storage occurs at an input rate established by the transmitter master clock. Within the buffer, the location of stationary read and write markers is determined. The subsequent retrieval of the data stream, at an output rate regulated by the receiver's master clock, is initiated from the position of the read marker whenever data is written to the position of the write marker.

Since the buffer is a circular buffer this process repeats. Additionally, the read and write marker positions are selected such that they produce a delay greater than the difference between the input rate and the output rate over the length of the buffer. This delay provides an offset which compensates for moderate amounts of drift between the transmitter and receiver master clocks. When the offset is insufficient, however, data stream processing is modified by ignoring at least some of the data stream when the input rate is faster than the output rate, and repeating at least some of the data stream when the input rate is slower than the output rate. In this manner a method of digitized voice reconstruction without reliance upon network synchronization is achieved.

BRIEF DESCRIPTION OF DRAWINGS

FIG. 1 is a block diagram of a portion of a communication system employing radio telephone techniques for receiving voice and data;

FIG. 2 is a detailed diagram of the signal processing block of FIG. 1 according to the preferred embodiment of the present invention; and FIG. 3 is a diagram of the circular buffer of FIG. 2 for storing and asynchronously retrieving data according to the preferred embodiment of the present invention.

DESCRIPTION OF PREFERRED EMBODIMENT

FIG. 1 depicts a block diagram of a portion of a communication system 100 employing radio telephone techniques for receiving voice and data. Since it is understood by those skilled in the art that other components and devices are ordinarily included in this environment, only those pertinent to this invention will be discussed.

In the preferred embodiment, device 120 is a modem. This modem is designed to communicate with a transmitter (not shown) via RF channels. Typically, the transmitter will take a digital data stream, such as digitized voice samples, and add various signalling and overhead information to create a data message. This message is modulated onto a carrier signal then transmitted over an RF channel. When received by antenna 128, the carrier signal is passed to the receiver 126 via line 122. The receiver 126 recovers the data message by demodulating the carrier signal, then directs the recaptured data message to signal processor 124 via line 240. The signal processor 124 subsequently decodes the data message, removes the signalling overhead information, buffers the recaptured digital data stream, converts the digitized voice samples into an analog signal, and outputs this information along line 256 to an end user, for example, a PSTN subscriber. Of importance, signal processor 124 does not perform network synchronization. Accordingly, one level of costly synchronization is eliminated by the present invention.

During operation, signal processor 124 does not recapture a clock signal from the incoming data message. In addition, it makes no attempt to establish a phase concurrence between the transmitter and the receiver master clocks prior to data stream storage, retrieval, or reconstruction. Instead, retrieval and reconstruction are intentionally delayed by a buffer, then allowed to proceed at a rate independent of the rate of the incoming data stream.

The buffered delay is selected in order to provide an offset that compensates for moderate amounts of timing drift. Consequently, timing drift compensation replaces network synchronization, as one means for maintaining the quality of digitized speech during voice reconstruction. During instances of extreme drift, the quality of reconstructed speech is further maintained by modifying the processing of the data stream. This modification includes ignoring at least some of the data stream when the input rate is faster than the output rate, and repeating at least some of the data stream when the input rate is slower than the output rate.

It is expected that a decision to ignore or repeat will result in identifiable levels of distortion. Distortion is the falsified reproduction of the original voice pattern due to timing drift error during the reconstruction of a voice pattern. It is well established that the higher the incidence of distortion, the lower the quality of the reconstructed speech. Thus, to maintain the high quality of reconstructed speech, it is essential to reduce the frequency with which distortion is introduced into the reconstruction process.

In the preferred embodiment, a decision to ignore or repeat, if made at all, occurs only once per buffer cycle. During normal operation, the timing drift difference between the input rate and the output rate is initially neglected. Once per buffer cycle, however, a re-synch signal is issued. Re-synch will force at least some of the data stream to be ignored if the input rate is faster than the output rate over the length of the buffer. Conversely, re-synch will cause at least some of the data stream to be repeated if the input rate is slower than the output rate over the length of the buffer. In this manner, the timing drift error caused by differences between the input rate and the output rate are resolved.

Modified data stream processing provides yet another means for maintaining the quality of digital speech during digitized voice reconstruction. While the preferred embodiment suggests modifying data stream processing only once per buffer cycle, it will be appreciated that an alternative solution is dispersing the data stream processing modifications over the length of the buffer cycle, thereby smoothing the effect of timing drift error. In addition, it will be appreciated that modifying the processing of the data stream prior to storage in the circular buffer achieves the aforementioned goals without departing from the spirit of the present invention.

In the preferred embodiment, rather than synchronizing a receiver's master clock to that of a transmitter, the devices are permitted to run at their own independent rates, having an indeterminate phase relationship. A digital speech data stream is then stored and retrieved from a buffer at these independent rates, while moderate timing drifts are handled by delaying data stream retrieval. As drift becomes excessive, however, the high quality of the digitized speech is still maintained by ignoring at least some of the data stream when the input rate is faster than the output rate, and repeating at least some of the data stream, when the input rate is slower than the output rate. In this way the introduction of distortion can be held to a single occurrence during each buffer cycle. Furthermore, by maintaining a relatively short buffer, the amount of timing drift experienced over the length of a buffer is minimized.

For a more detailed discussion of the signal processing block of FIG. 1, reference is now made to FIG. 2. FIG. 2 is a detailed diagram of the signal processing block of FIG. 1 according to the preferred embodiment of the present invention. During operation, a demodulated data message is passed from receiver 126 of FIG. 1, to the signal processor 124 via line 240. The data message, comprising a serial data string of digitized voice samples, is then routed to decoder 242.

Decoder 242 decodes the data message and transforms the serial string into digital voice packets. In the preferred embodiment, each voice packet comprises 16 voice samples, each sample comprising 8-bits of digitized voice. It will be appreciated by those skilled in the art that the literature on packet voice transmission/reception is readily available. For a representative tutorial article on the subject of packetized voice, see "Packet Voice: When It Makes Sense" by Randy Cole in the September/October, 1982 issue of Speech Technology. Decoder 242 utilizes Mu-law Pulse Coded Modulation (PCM) techniques to decode the data message, then under the direction of the master processor 258, passes the voice packets to reformatter 246 along line 244.

The reformatter 246 is responsible for stripping the signalling overhead from the packeted voice, thereby providing packets of "raw" data which are fed to the circular buffer 250. The term raw simply refers to the absence of any signalling or overhead information. The circular buffer 250 receives the data from reformatter 246 along line 248. This input data stream has an instantaneous input rate determined by the transmitter's master clock.

The circular buffer 250 first stores the data stream, then postpones the processing thereof, by introducing a delay before permitting the data to be retrieved at an output rate determined by the oscillator 262 via line 264. Of importance, this delay is selected as a function of the difference between the input rate and the output rate, over the length of the buffer. Accordingly, an offset is established which attempts to compensates for moderate amounts of timing drift between the transmitter master clock and the receiver master clock, herein also refereed to as oscillator 262. When the compensating offset is insufficient, however, data stream processing is modified by ignoring at least some of the data stream when the input rate is faster than the output rate, and repeating at least some of the data stream when the input rate is slower than the output rate.

From circular buffer 250, the digital voice samples are routed along line 252 to digital-to-analog (D/A) converter 254 where they are reconstructed into a voice pattern and output along line 256. It will be appreciated by those skilled in the art that D/A 254 may be any suitable device that takes a digital data stream and provides an analog representation.

Reference is now made to FIG. 3. FIG. 3 is a diagram of the circular buffer of FIG. 2 for storing and asynchronously retrieving data according to the preferred embodiment of the present invention. As previously discussed, circular buffer 250 receives packets of raw data from reformatter 246 along line 248 of FIG. 2. A closer inspection reveals that circular buffer 250 is a buffer of N slots in length, where N is a finite number and a slot is defined as the memory space required to store a packet of raw data. During operation, the first packet received by circular buffer 250 is stored in the first memory slot, while the second packet received is stored in the second memory. Each successive packet received is placed in successive slots in memory until the buffer is filled to the Nth slot. The next received packet is then rewritten to the first memory slot, and the process repeats.

In the preferred embodiment N is selected such that a re-synch signal is issued once per buffer cycle at a fairly repetitive rate relative to either the circular buffer input or output rates. In this manner, the amount of timing drift per buffer cycle is minimized by maintaining a relatively short buffer.

Circular buffer 250 has a stationary write marker 300, a stationary read marker 301, a travelling write pointer 302, and a travelling read pointer 303. Each time a packet is written to the Xth slot, the location of the write marker 300, a re-synch signal is issued. Re-synch will forces the read pointer 303 to return to the location of the read marker 301 and recommence data retrieval. In addition, the time required for write pointer 302 to travel from the 1st slot to the Xth slot, at the input rate, is Δ. Δ is the duration of the previously mentioned buffered delay.

Accordingly, when the input rate to the buffer is faster than the output rate from the buffer, a re-synch signal will issue before read pointer 303 has retrieved the full buffer contents. In this situation, the remaining buffer contents are ignored as read pointer 303 returns to the position of read marker 301. When the input rate to the buffer is slower than the output rate from the buffer, however, a re-synch signal will issue after read pointer 303 has retrieved the full buffer contents. In this situation, re-synch will force read pointer 303 back to the location of read marker 301 and some previously retrieved data will be repeated.

As previously discussed ignoring or repeating some of the stored samples may result in audible levels of distortion. It will be appreciated, however, that by manipulating the length of the buffer, as well as carefully positioning the read and write marker locations, it is possible to customize a buffered arrangement whereby the need to ignored or repeat data is practically eliminated. In this manner, the asynchronous retrieval and reconstruction of digital voice data is achieved.

Although the present invention has been described with reference to a particular embodiment, other embodiments will become apparent to those skilled in the art. It is therefore intended that the invention not be limited, except as indicated by the appended claims.

We claim:

1. A method of performing the asynchronous reconstruction of digitized speech comprising the steps of:
   storing an input data stream at an input rate;
   retrieving the stored data stream at an output rate; and
   modifying stored data stream retrieval by:
      ignoring at least some of the stored data stream when the input rate is faster than the output rate; and
      repeating at least some of the stored data stream when the input rate is slower than the output rate.

2. The method of claim 1 wherein the input data stream comprises:
   digitized speech; and
   packets of digitized speech.

3. The method of claim 1, wherein the storing step is performed with a circular buffer.

4. The method of claim 3, wherein the circular buffer has a read pointer and a write pointer.

5. The method of claim 1, further including the step of delaying the retrieval of the stored data stream.

6. The method of claim 5, wherein the step of delaying further comprises the steps of:
   establishing a read marker location;
   establishing a write marker location; and
   initiating data stream retrieval from the read marker location, under direction of the read pointer, whenever data is written to the write marker location, under direction of the write pointer.

7. The method of claim 6, wherein the read marker location and the write marker location are determined as a function of the difference between the input rate and the output rate over the time to fill the buffer.

8. The method of claim 1, further comprising the step of:
   converting the stored data stream into an analog representation, after retrieval.

9. A data communication receiver capable of asynchronously reconstructing digitized speech into an analog representation comprising:
   storing means for storing an input data stream at an input rate;

retrieving means connected to the storing means for accessing the stored data stream at an output rate; and altering means coupled to the retrieving means for modifying stored data stream retrieval comprising:
means for ignoring at least some of the stored data stream when the input rate is faster than the output rate, and
means for repeating at least some of the stored data stream when the input rate is slower than the output rate.

10. The method of claim 1 wherein the input data stream comprises:
digitized speech; and
packets of digitized speech.

11. The data receiver of claim 9, wherein the storing means comprises a circular buffer having a read pointer and a write pointer.

12. The data receiver of claim 11, wherein the circular buffer has a read marker location and a write marker location.

13. The data receiver of claim 9, further comprising: means for delaying stored data stream retrieval.

14. The data receiver of claim 13, wherein the delaying means further comprises:
means for establishing the read marker location;
means for establishing the write marker location; and
means for initiating stored data stream retrieval from the read marker location, under direction of the read pointer, each time data is written to the write marker location, under direction of the write pointer.

15. The data receiver of claim 14, wherein the read marker location and the write marker location are determined as a function of the difference between the input rate and the output rate over the time to fill the buffer.

16. The data receiver of claim 9, further comprising:
means for converting the stored data stream into an analog representation.

17. A method of performing the asynchronous reconstruction of digitized speech into an analog representation comprising the steps of:
storing an input data stream in a buffer at an input rate;
establishing a read marker location within the buffer;
establishing a write marker location within the buffer;
initiating stored data stream retrieval from the read marker location, at an output rate, under direction of a read pointer, each time data is written to the write marker location, under direction of a write pointer;
modifying stored data stream retrieval by:
ignoring at least some of the stored data stream when the input rate is faster than the output rate, and
repeating at least some of the stored data stream when the input rate is slower than the output rate; and
converting the stored data stream into an analog representation, after retrieval.

18. The method of claim 17, wherein the buffer is a circular buffer.

19. The method of claim 17, wherein the read marker location and the write marker location are determined as a function of the difference between the input rate and the output rate over the time to fill the buffer.

20. The method of claim 17 wherein the input data stream comprises:
digitized speech; and
packets of digitized speech.

* * * * *